United States Patent [19]

Yokokura et al.

[11] Patent Number: 5,220,447
[45] Date of Patent: Jun. 15, 1993

[54] LIQUID CRYSTAL DISPLAY DEVICE AND PHASE PLATE THEREFOR

[75] Inventors: Hisao Yokokura, Hitachi; Teruo Kitamura, Katsuta; Akio Mukoh, Mito; Junichi Hirakata, Hitachi; Yasuhiko Kando, Mobara; Isoji Sakai, Kobe; Yasuo Fujimura; Noboru Masutani, both of Ashiya, all of Japan

[73] Assignees: Hitachi, Ltd., Tokyo; Denko Corporation, Osaka, both of Japan

[21] Appl. No.: 494,551

[22] Filed: Mar. 16, 1990

[30] Foreign Application Priority Data

Mar. 18, 1989 [JP] Japan .................... 1-066778

[51] Int. Cl.⁵ ............................................. G02F 1/13
[52] U.S. Cl. .......................................... 359/93; 359/62; 359/73; 359/76
[58] Field of Search .......... 350/347 V, 347 E, 347 R, 350/339 R, 340, 334; 359/62, 73, 74, 77, 79, 82, 93, 94, 76

[56] References Cited

U.S. PATENT DOCUMENTS

| 4,385,806 | 5/1983 | Fergason | 350/347 R |
| 4,701,028 | 10/1987 | Clerc et al. | 350/347 E |
| 4,813,770 | 3/1989 | Clerc et al. | 359/74 |
| 4,889,412 | 12/1989 | Clerc et al. | 350/347 E |
| 4,906,073 | 3/1990 | Hunahata et al. | 350/347 R |
| 4,935,654 | 6/1990 | Suzaki et al. | 350/347 R |
| 4,973,137 | 11/1990 | Kozaki | 350/347 R |
| 4,984,873 | 1/1991 | Takiguchi et al. | 350/347 R |
| 4,995,704 | 2/1991 | Yamamoto et al. | 350/347 R |

FOREIGN PATENT DOCUMENTS

| 1-273017 | 10/1989 | Japan | 359/74 |
| 2-20824 | 1/1990 | Japan | 359/62 |
| 2-35416 | 2/1990 | Japan | 359/62 |
| 2-99927 | 4/1990 | Japan | 359/74 |
| 2-130522 | 5/1990 | Japan | 359/74 |
| 2-278228 | 11/1990 | Japan | 359/94 |

OTHER PUBLICATIONS

Phase Plate Mode B/W Super TN Liquid Crystal Display Panel Nagae, (Aug. 8, 1988) pp. 29-34.
Technical Report vol. II, No. 27, (Nov. 1987), Okumura, et al., pp. 79-84.
Okumura, et al., "Neutralized STN (NTN)-LCD Full Color Picture Image" (English Translation-pp. 1-18) and pp. 79-84 of in Japanese, Nov. 1987.
Nagae, et al., "Phase Plate Model B/W Super TN Liquid Crystal Display Panel" (English Translation-p. 1-23), Aug. 1988.

Primary Examiner—Rolf Hille
Assistant Examiner—Minhloan Tran
Attorney, Agent, or Firm—Antonelli, Terry, Stout & Kraus

[57] ABSTRACT

A liquid crystal display device comprising: a liquid crystal display element formed by holding, between two substrates at least one of which has a light-permeable electrode, a liquid crystal layer in which liquid crystal molecules of a nematic liquid crystal having positive dielectric anisotropy and containing an optically active substance has a helical axis perpendicular to the substrates between the substrates and are helically oriented, and the liquid crystal molecules between the substrates have a twist angle of 180 to 270 degrees, and a phase plate formed by stacking water surface development films of an organic polymer with changing the orientation axes thereof at a constant angle, wherein the contrast ratio, a ratio between brightness in white display and brightness in black display, is remarkably excellent over that of a device obtained by stacking plastic films, and the transmissivity, a quotient of background brightness and light source brightness, is equivalent to that of a conventional double layer structure liquid crystal display device.

28 Claims, 6 Drawing Sheets

LIQUID CRYSTAL DISPLAY DEVICE AND PHASE PLATE THEREFOR

BACKGROUND OF THE INVENTION

1. Field of the Invention

This invention relates to a liquid crystal display device, and in particular, to a field-effect liquid crystal display device and a phase plate therefor.

2. Description of the Related Art

A conventional twisted nematic type liquid crystal display element has a 90 degrees-twisted helical structure of a nematic liquid crystal having positive dielectric constant anisotropy between two electrode substrates, and a polarizer is disposed outside each of the above electrode substrates such that its polarization axis is at right angles or parallel with liquid crystal molecules adjacent to the electrode substrate.

Such a liquid crystal display element having a twist angle of 90 degrees has problems concerning steepness between voltage charged to a liquid crystal layer and transmissivity of the liquid crystal layer, and visual angle characteristic, and hence, achievement of high duty multiplexing is practically limited.

Further, in order to meet demands for display quality improvement and information capacity increase in a liquid crystal display element, a device using a display element of super twist birefringence type (STN) where the liquid crystal between two electrodes is oriented by twisting it at 180 degrees or more has been put to practical use. However, this device has a problem that it can only achieve display of limited colors, e.g. display of blue in yellow ground or display of blue in white ground.

In recent years, a display element of STN type free from coloring unlike the above has been desired, and there has therefore been proposed a method of forming a double layer structure of liquid crystal elements by stacking them.

That is, there is a proposal for a complete black and white display formed by stacking display elements having an identical twist angle and Δn.d and a different rotation angle (Okumura, Nagata and Wada: Television Society Technical Report, Vol. 11, No. 27, page 79, 1987).

However, when the STN liquid crystal elements are used to form the double layer structure, the margin of Δn.d is small, and it is difficult to control the cell gap. And, two pairs of the STN liquid crystal elements are required, or increase the cost. Therefore, the mass producibility of such a device is low.

In particular, in large-sized display devices which are used in office automation appliances and require two pairs of glass plates as cell substrates, the above double layer structure is undesirable, since it is a large factor to prevent the weight decrease thereof.

For this reason, there is another proposal for black and white display by phase compensation using, in combination, one liquid crystal element and a phase plate of a plastic film having birefringence characteristic (Nagae, Hirakata and Komura: Television Society Technical Report, Vol. 12, No. 32 page 29, 1988).

The above display device using a plastic film phase plate in combination has a lower contrast than the display device using two pairs of liquid crystal display elements. In particular, an adhesive necessary for attaching the film has an influence, and the contrast therefore decreases according to the number of the attached films.

SUMMARY OF THE INVENTION

It is an object of this invention to provide a liquid crystal display device having a contrast equivalent or similar to that of the aforesaid double layer liquid crystal display device or monolayer liquid crystal display device using the plastic film phase plate.

The first aspect of this invention is directed to a liquid crystal display device comprising:

a liquid crystal display element formed by holding, between two substrates at least one of which has a light-permeable electrode, a liquid crystal layer in which liquid crystal molecules of a nematic liquid crystal having positive dielectric anisotropy and containing an optically active substance has a helical axis perpendicular to the substrates between the substrates and are helically oriented, and the liquid crystal molecules between the substrates have a twist angle of 180 to 270 degrees, and a phase plate formed by stacking water surface development films of an organic polymer with changing the orientation axes thereof at a constant angle.

The above liquid crystal display device may naturally have a color filter.

Another aspect of this invention is directed to a phase plate for a liquid crystal display device, which is formed by taking up an organic polymer solution in a constant direction on a water surface at a higher rate than its spontaneous development rate to form an organic polymer film, and stacking the films with changing the orientation axes thereof at a constant angle.

Further, another aspect of this invention is directed to a phase plate for a liquid crystal display device, which is formed by developing a solution of an organic polymer in an organic solvent on a water surface, forming a solid film of the organic polymer while the film is taken up at a higher rate than a spontaneous development rate of the solution on the water surface and while the organic solvent is evaporated to increase the solution concentration, and stacking the films with changing the orientation axes thereof at a constant angle.

In this invention, the crystal display element is provided with a phase plate formed by stacking a plurality of specific organic polymer films having a constant angle difference in orientation axis and optical activity, whereby it is possible to obtain a liquid crystal display device having a contrast equivalent or similar to that of the aforementioned double layer liquid crystal display device or a monolayer liquid crystal display device using a plastic film phase plate.

In the present specification, the phase plate with constant angle difference in orientation axis means a phase plate formed by stacking thin films, which has been formed by a water surface development method, with changing the orientation axes of the thin films at a constant angle. The above thin films can be formed by taking up an organic polymer film from a solution containing said organic polymer dropped on a water surface, at a rate higher than its spontaneous development.

This invention will be explained hereinbelow by reference to drawings and Examples

1: nozzle, 2: vessel for water, 3: water surface, 4: thin film, 5: roll, 6: filmy substrate, 7: tunnel oven, 8: holder, 9: upper polarizer, 10: phase plate, 11: upper electrode substrate, 12: rubbing direction of the upper electrode substrate, 12': orientation axis of the lowermost film of the phase plate, 13: lower electrode substrate, 14: rubbing direction of the lower electrode substrate, 15: lower polarizer, 16: back light, 17: polarization axis of the upper polarizer, 18: liquid crystal molecule, 19: polarization axis of the lower polarizer, 24: color filter, 24a: blue filter, 24b: green filter, 24c: red filter.

DETAILED DESCRIPTION OF PREFERRED EMBODIMENTS

The process for production of the organic polymer film for the phase plate is explained first. For the film formation, an apparatus schematically shown in FIGS. 2 and 3 can be used.

Figure 3:
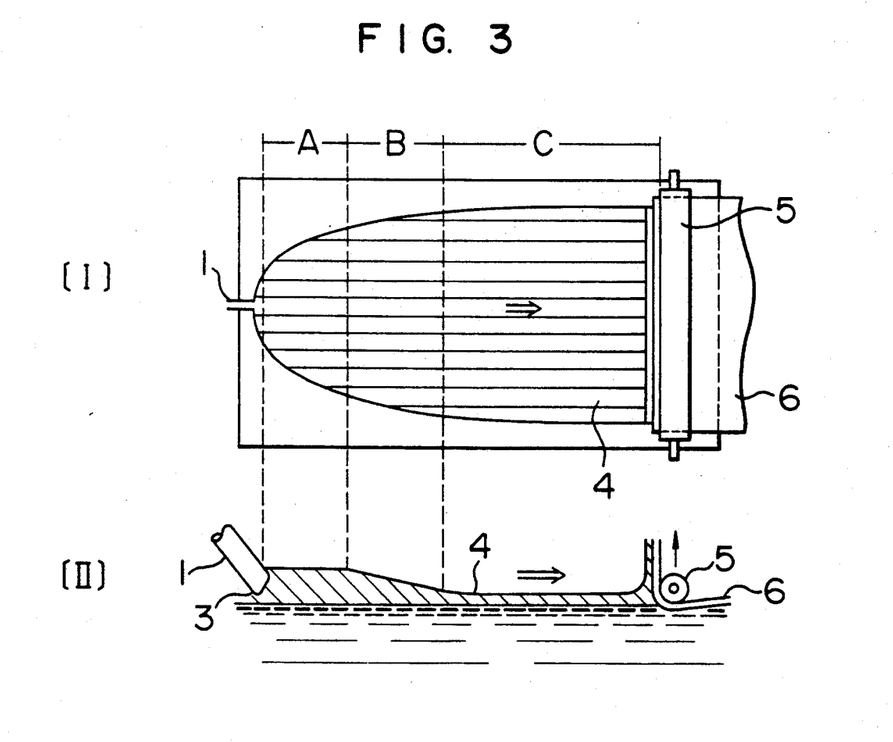
FIG. 3 is a schematic view showing a method of forming a water surface development film from an organic polymer solution, wherein (I) shows a plan view and (II) shows a side view.

An organic polymer solution, which is released from a nozzle 1 onto a water surface 3 in a water vessel 2 at a constant flow rate by using a quantitative pump (not shown), develops on the water surface spontaneously to form a film 4. FIG. 3 schematically shows a state in which the film is being formed.

FIG. 3(I) is a plan view, and FIG. 3(II) is a side view.

The organic polymer solution released onto the water surface 3 changes itself from a solution (A) through a gel state (B) to a solid state (C), whereby a film 4 is formed. The film 4 is taken up in the direction of an arrow mark by a filmy substrate 6 moving by means of a roll 5.

In this case, when the film is taken up at a rate higher than the spontaneous development rate of the organic polymer solution on the water surface, molecules of the film 4 can be oriented in the take-up direction. The take-up rate varies depending upon king of a solvent and kind of the organic polymer. It is, however, usually 5 m/minute to 25 m/minute.

Polymer films formed as above are stacked with giving one film a constant angle difference from the take-up direction of another film, whereby the phase plate of this invention can be obtained. In addition, the constant angle may be freely selected, and it is preferable to select such an angle before starting the stacking work. Since no adhesive is necessary to stack the polymer films, the stacking workability is good, and a phase plate having excellent optical activity, which will be described later, can be obtained.

The phase plate is directly placed on the liquid crystal display element without using any adhesive, whereby the object of this invention can be achieved.

In the above case, the angle difference in stacking the organic polymer films is selected such that the Δn.d of an applied liquid crystal display element and the Δn.d of the resulting phase plate are in agreement, whereby black and white display can be achieved.

The organic polymer film of this invention can be formed by the above water surface development method, and it is possible to use those which are clear or have a total light transmissivity of not less than 70% at the visible ray region (400 to 700 nm). In particular, non-chromatic films are preferably used.

The materials for forming these organic polymer films are as follows: olefinic polymers such as polycarbonate, etylene-vinyl alcohol copolymer, polyvinyl chloride, polyvinylidene chloride, polystyrene, polyimide, polyamide, polyamide-imide, polyimidesiloxane, polymelamine, polyurea, polybutene, poly-p-xylylene, polyester, polymethylpentene, etc.; cellulose derivatives such as cellulose acetate, etc.; fluorine-containing polymers such as polyvinyl fluoride, polyvinylidene fluoride, etc.; acrylate polymers such as polymethyl methacrylate, etc.; liquid crystal polymers; or copolymers of these.

As a solvent for development of the above polymers, any solvent which can fully dissolve the polymers are usable. Examples of such a solvent include hydrophilic solvents such as aliphatic or aromatic ketone, ester, alcohol, amine, aldehyde, peroxide and mixtures of these.

The above thin film of this invention can be directly provided to the surface of the liquid crystal display element substrate or onto the polarizer. Further, it can be also formed on an in organic film of $SiO_2$, $Al_2O_3$, $TiO_2$, or the like. And, a silane coupling agent ca be also used in combination.

Figure 7:
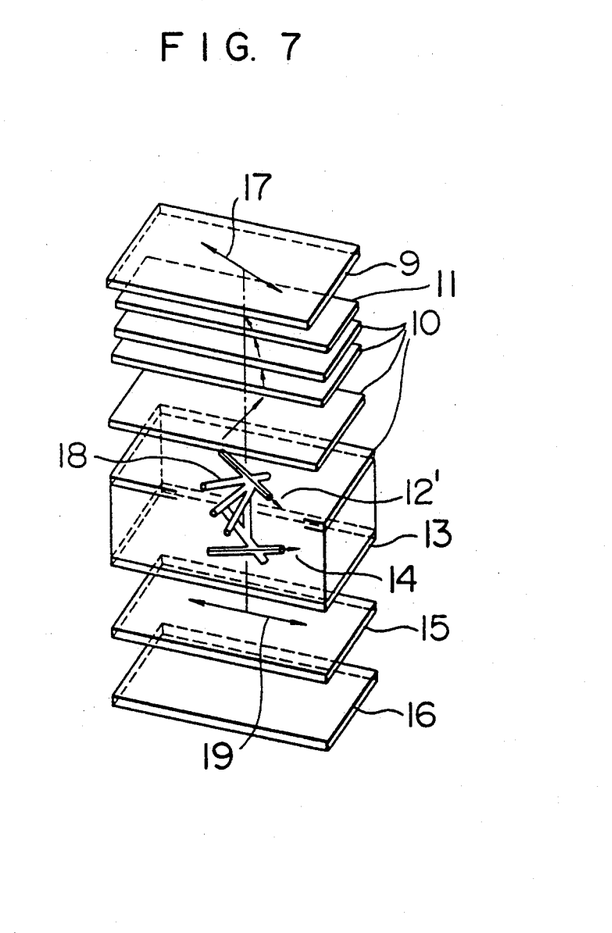
FIG. 7 is a schematic perspective view showing another embodiment of the liquid crystal display device according to the present invention, having the phase plate used as the alignment film.

Furthermore, it can be also used as an alignment film for a liquid crystal in addition to the use as a phase plate. See FIG. 7. In this case, it is necessary to provide the phase plate to a surface contacting the liquid crystal (see the lowermost phase plate 10, having orientation axis 12', in FIG. 7) and bring the orientation axis of the surface layer thereof into agreement with the orientation direction of the liquid crystal.

It may be also used as an optical modulator film in optical apparatus.

The phase plate of this invention has optical activity since it is formed by stacking the films with changing the orientation axes thereof at a constant angle.

The phase difference is destroyed by bringing the {n.d thereof into agreement with the Δn.d of the liquid crystal element, whereby black and white display is made possible.

The phase plate of this invention has an excellent contrast over a conventional phase plate of a plastic film, and the reason therefor is considered to be that the phase plate of this invention has a smaller thickness and requires no adhesive for the film stacking.

This invention will be explained by reference to Examples.

EXAMPLE 1

Figure 1:
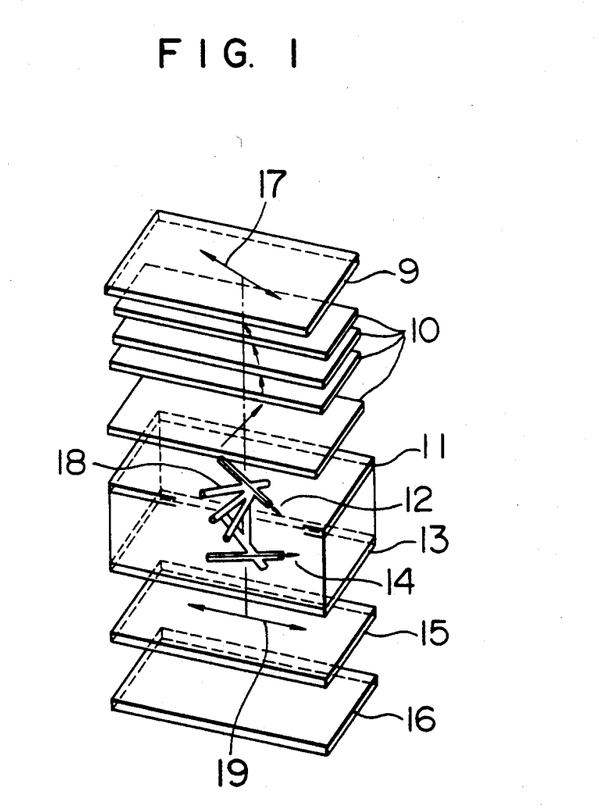
FIG. 1 is a schematic perspective view showing a constitution of a liquid crystal display device of this invention.

FIG. 1 shows a schematic view of a constitution of the liquid crystal display device of this invention.

A liquid crystal is held between an upper electrode substrate 11 having a clear electrode and a lower electrode substrate 13 having a clear electrode, and the liquid crystal, indicated as 18, is twistedly oriented due to orientation treatment of said upper and lower substrates and an optically active substance. In this liquid crystal display element, the upper electrode substrate 11 is provided with a phase plate 10, and the liquid crystal display element is held between upper and lower polarizers 9 and 15. A back light 16 is provided on the lower side.

A liquid crystal display element was constituted such that a liquid crystal molecular layer between the surfaces of upper and lower substrates have a twist angle of 240 degrees and that the liquid crystal molecular layer had a thickness (d) of 6 μm. S811 (supplied by Merk Co.) as an optically active substance was incorporated into a nematic liquid crystal containing, as main components, a biphenyl-based liquid crystal and an ester cyclohexane-based liquid crystal to form a liquid crystal having a refractive anisotropy (Δn) of 0.133. This liquid crystal was sealed in the liquid crystal display element to form an STN liquid crystal display element having a Δn.d of 0.8 μm.

A phase plate, which was formed of stacked thin films obtained by a water surface development method and which had a Δn.d of 0.8 μm, was formed on the substrate surface of the liquid crystal display element. In addition, the Δn.d was calculated by using a compensator after the development film were formed.

The process for forming the above phase plate will be explained below.

As a material for the above thin film, a liquid crystal polymer formed by copolymerization of polyethylene terephthalate with p-hydroxybenzoate and represented by the following formula:

[1]

was used. A solution was prepared by dissolving the liquid crystal polymer into a 50:50 (by weight) mixture solution of a phenol and tetrachloroethane in such an amount that the polymer concentration was 10%.

Figure 2:
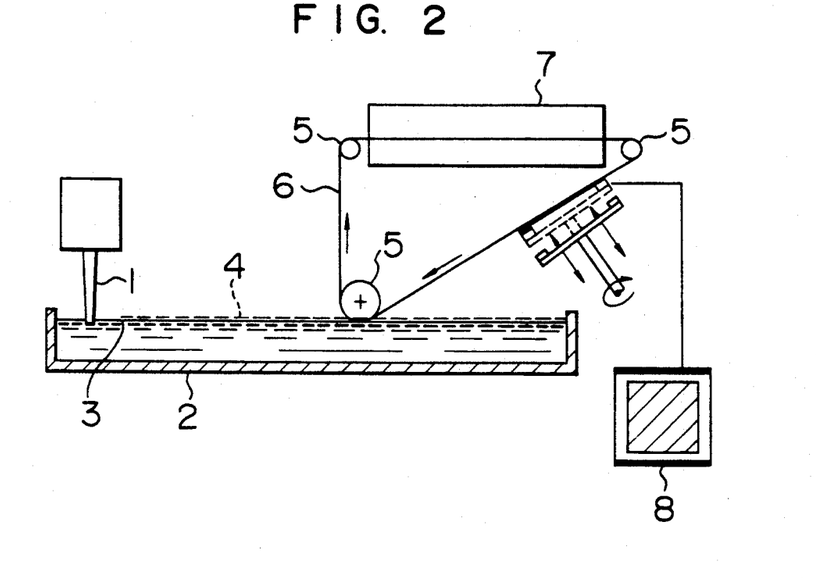
FIG. 2 is a schematic view showing an apparatus for producing a phase plate.

The thin film was formed from the above solution as a developer by using a continuous film-forming apparatus shown in FIGS. 2 and 3.

As shown in FIG. 3, the developer is continuously released and developed onto a water surface through a nozzle 1 to form a development thin film 4. The development thin film 4 is taken up by means of a belt-like filmy substrate 6 moving in an arrow direction at a constant rate owing to a roll 5.

In this case, as shown in FIG. 3 (I) and (II), the developer flowing out from the nozzle 1 is then taken up and stretched by the filmy substrate 6, and while it moves along a region A through a region B to a region C, the solvent undergoes partial volatilization, and the solid thin film 4 is formed.

The thin film is taken up at a higher rate than the spontaneous development rate of the developer on the water surface, whereby the organic polymer forming the thin film is oriented in the take-up direction, and the resultant thin film has optical polarization characteristic. In addition, in the above process, a thin film having a thickness of 500 to 1,000Å can be obtained by one operation.

As shown in FIG. 2, a liquid crystal display element was fitted to a holder 8 provided onto the filmy substrate 6, and the thin film is attached directly to the surface of the element substrate. The attached thin film is allowed to pass through a tunnel drying oven to dry it and remove the solvent.

In addition, in this Example, the tunnel drying oven was maintained at 60° C., and it was set that the thin film took about five minutes to pass through the tunnel drying oven.

Further, in this Example, the filmy substrate 6 was allowed to move at 3 m/minute to form a film on the liquid crystal display element substrate surface.

The liquid crystal display element was removed from the holder 8 each time when it was stacked to form five layers, and then the element was turned at 10 degrees apart from the movement direction of the filmy substrate 6, i.e. the axis of the thin film take-up direction (to be referred to as orientation axis hereinafter) and again fitted. Then, the above procedure was repeated to stack the thin film on the above stacked film.

Every time that five layers of the above thin film were stacked, the orientation axis was turned by 10 degrees in the same direction, and 100 layers in total were stacked to form a phase plate having a Δn.d of 0.8 μm on the liquid crystal display element substrate. A total change in orientation direction of the phase plate (from the first 5 layers, to the last 5 layers, of the 100 total layers) was 190° (that is, 19 changes of 10° each).

In addition, under a crossed Nicols polarization microscope, a compensator (phase compensating plate) and the formed phase plate were stacked, and the phase difference of the compensator was set so as to give a dark field, based on which value the Δn.d was determined.

The brightness ratio between the background and display portion of the above display device, i.e. a contrast ratio, was 32:1, and the quotient of the background brightness and the light source brightness, or a transmissivity, was 20%.

Figure 4:
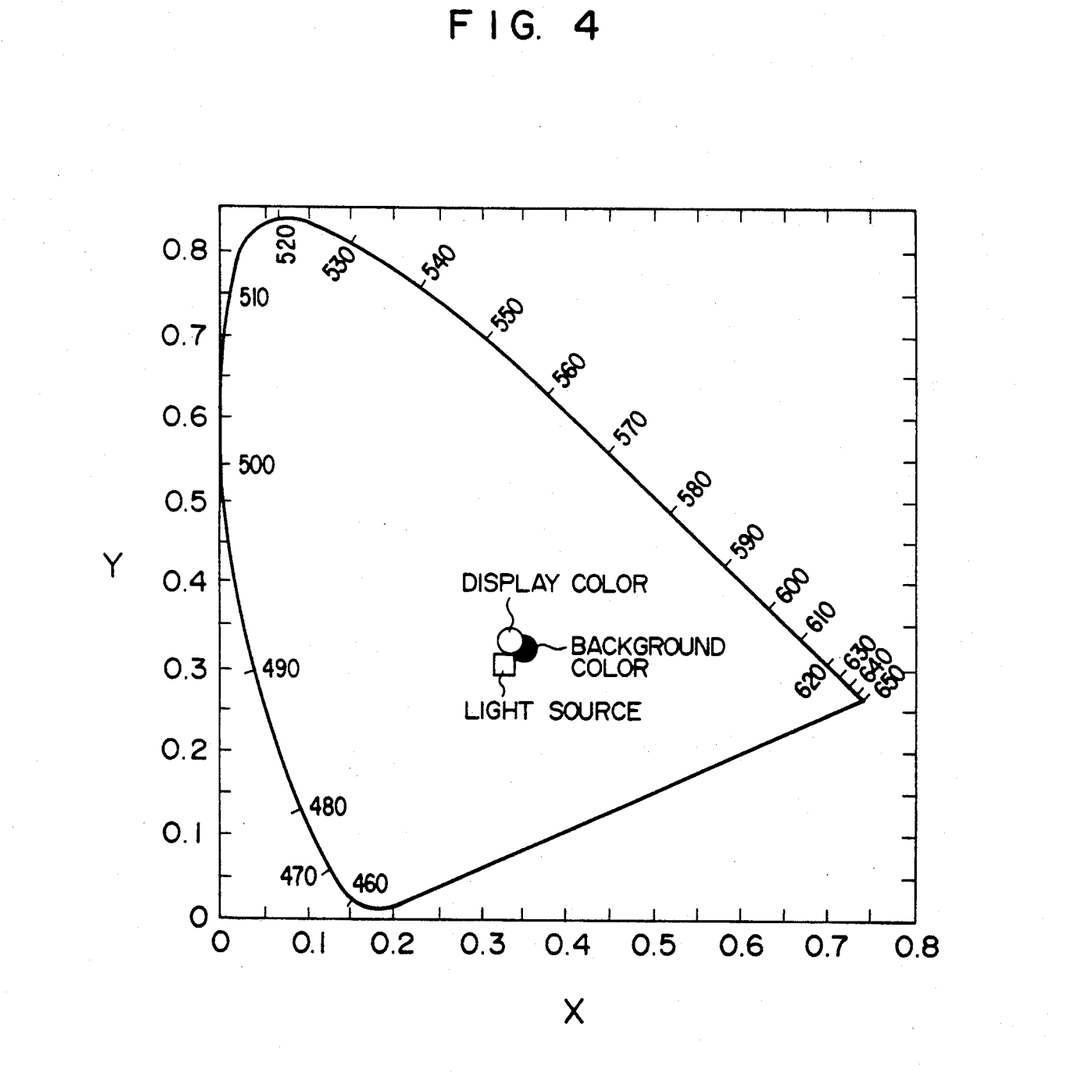
FIG. 4 is a CIE chromaticity coordinate graph for colors of background and display portions of a liquid crystal display device of this invention.

FIG. 4 is a CIE chromaticity coordinate graph for colors of the background and display portions.

As shown in FIG. 4, the background color (○) and the display color (●) are all in positions nearly in the middle of the coordinates and near to the light source (□), which shows that these portions are nonchromatic. It is hence seen that the display device was a black and white display device.

In this Example, the phase plate was directly provided to the liquid crystal display element substrate surface. However, in place of the above liquid crystal display element, a film formed of the same material as that for the phase plate can be used, and a thin film can be directly formed thereon in the same way as above and used as a phase plate. Further, a thin film, which is formed on a film substrate, such as polyethylene terephthalate, or the like, and separated from the film, can be also used as a phase plate.

EXAMPLE 2

A developer solution was prepared by dissolving a polycarbonate into an 80:20 (by weight) mixture solution of a cyclohexanone and acetophenone in such an amount that the polymer concentration was 7% by weight. By the use of this solution, a thin film was formed on a liquid crystal display element substrate by a water surface development method in the same way as in Example 1. And, every time that 10 layers of the film were stacked, the orientation axis was changed by 20 degrees, and this procedure was repeated 11 times to form a phase plate composed of 120 layers in total and having a Δn.d of 0.8 μm. Similarly as with Example 1, a total change in orientation axis of the films of the phase plate was 220°. The constitution of a liquid crystal display device which was provided with the phase plate was as shown in FIG. 1.

The liquid crystal display device had a contrast ratio, between the background portion and the display portion, of 30:1, and a transmissivity, in the background portion, of 16%.

EXAMPLE 3

A developer solution was prepared by formulating a branched polymer, liquid crystal polysiloxane, into an 80:20 (by weight) mixture solution of toluene and methyl ethyl ketone in such an amount that the polymer concentration was 8% by weight. By the use of this solution, a thin film was formed on a liquid crystal display element substrate by a water surface development method in the same way as in Example 1. And, every time that 8 layers of the film were stacked, the orientation axis was changed by 10 degrees, and this procedure was repeated 23 times to form a phase plate composed of 192 layers in total and having a Δn.d of 0.8 μm. A total change in orientation axis of films of the phase plate, during stacking of the layers, was 230°. The constitution of a liquid crystal display device which was provided with the phase plate was as shown in FIG. 1.

The liquid crystal display device had a contrast ratio, between the background portion and the display portion, of 28:1, and a transmissivity, in the background portion, of 18%.

EXAMPLE 4

A developer solution was prepared by dissolving a polyimide, obtained by polymerization of 3,3', 4,4'-benzophenone tetracarboxylic dianhydride and 4,4'-bis(m-aminophenoxy)diphenyl sulfone, into a 50:50 (by weight) mixture solution of N-methyl-2-pyrrolidone and acetophenone in such an amount that the polymer concentration was 7% by weight.

By the use of this solution, a thin film was formed at a take-up rate of 12 m/minute by a water surface development method in the same way as in Example 1. And, every time that 5 layers of the film were stacked, the orientation axis was changed by 10 degrees, and this procedure was repeated 47 times to form a phase plate composed of 240 layers in total and having a Δn.d of 0.8 μm. A total change in orientation axis, in repeatedly changing the orientation axis 47 times at 10° per time, was 470°. The constitution of a liquid crystal display device which was provided with the phase plate was as shown in FIG. 1.

The liquid crystal display device had a contrast ratio, between the background portion and the display portion, of 26:1, and a transmissivity, in the background portion, of 15%.

EXAMPLE 5

Figure 5:
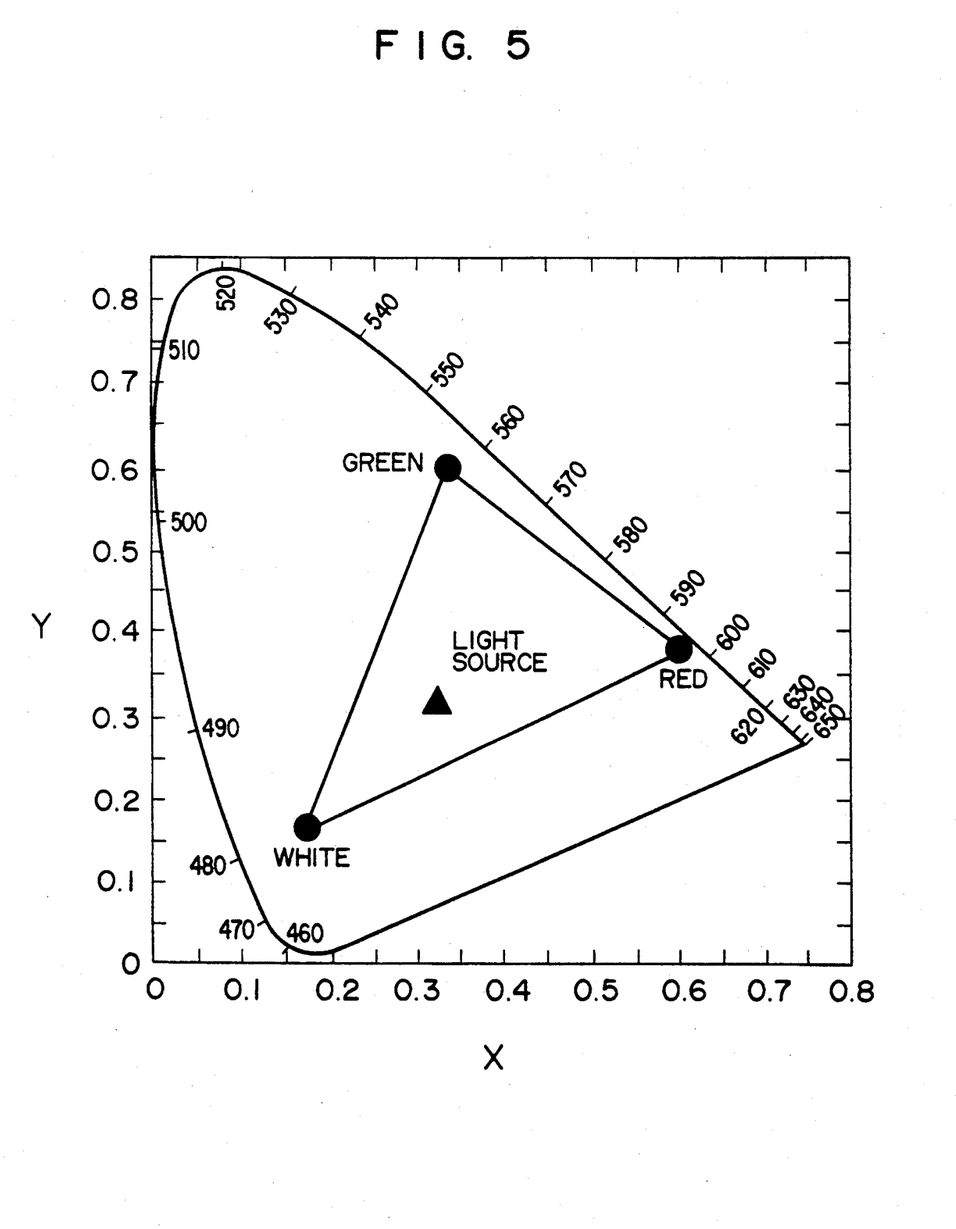
FIG. 5 is a CIE chromaticity coordinate graph for colors of a display portion of a liquid crystal display device of this invention in which color filters are provided in combination.
Figure 6:
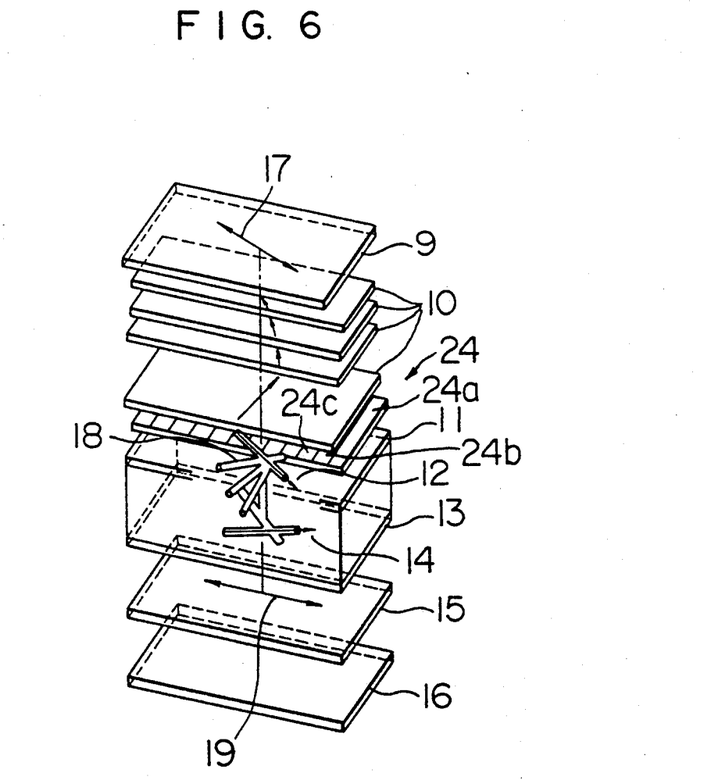
FIG. 6 is a schematic perspective view showing a liquid crystal display device of the present invention, having a color filter.

A matrix-type liquid crystal display device, prepared by printing color filters of red, green and blue on the phase plate surface of the liquid crystal display device of Example 1, was driven by 1/200 duty. See FIG. 6. FIG. 5 is a graph where the display colors in this case are indicated on CIE chromaticity coordinates.

It is seen that each of the colors had a high color purity and a wide display color range. In addition, the color filters were the same as those used in general liquid crystal color television receivers.

The element used in this Example had a twist angle of 240 degrees. And, when liquid crystal display elements having a Δn.d of 0.4 to 1.5 μm and a twist angle of 180 to 270 were used, the results were similar to that of this Example.

The above phase plate can also give like effects even when it was used as a lining for a polarizer or as an undercoat for an orientation film.

Further, as the above color filters, a clear plastic film used in a liquid crystal color television receiver can be used by coloring same.

COMPARATIVE EXAMPLE 1

A liquid crystal display device was prepared by using one polycarbonate film (Δn.d=0.8 μm) as a phase plate and the same liquid crystal as that used in Example 1, and the contrast and transmissivity of the liquid crystal display device were measured.

The device had a contrast ratio of 8:1 and a transmissivity of 15%.

COMPARATIVE EXAMPLE 2

Two polycarbonate films (Δn.d=0.4 μm) were stacked by changing the orientation axis of one from that of the other by 30 degrees to prepare a phase plate. This phase plate was used, and the procedure of Comparative Example 1 was repeated to prepare a liquid crystal display device.

The device had a contrast ratio of 19:1 and a transmissivity of 18%.

This invention uses the phase plate formed by stacking the organic polymer films obtained by a water surface development method with changing the orientation axes thereof at a constant angle, whereby the contrast ratio, a ratio between brightness in white display and brightness in black display, of the resultant liquid crystal display device is remarkably excellent over that of a device obtained by stacking plastic films, and it is also possible to obtain a transmissivity, a quotient of background brightness and light source brightness, which is equivalent to that of a conventional double layer structure liquid crystal display device.

Further, since the number of the liquid crystal layers required is one in this invention, it is possible to provide a compact, light-weight and high-quality liquid crystal display device.

What is claimed is:

1. A liquid crystal display device comprising:
   a liquid crystal display element comprising two substrates at least one of which has a light-permeable electrode, and a liquid crystal layer sandwiched between the two substrates, with liquid crystal molecules of the liquid crystal layer having a twist angle of 180 to 270 degrees, and
   an optical phase plate arranged in optical relation with the display element and comprised of a plurality of films stacked on each other, each of said films being made of an organic polymer and having an orientation axis, adjacent films of the plurality of films having a direction of the orientation axis changed at a constant angle.

2. A device according to claim 1, which comprises a color filter.

3. A device according to claim 1, wherein the phase plate is directly positioned on the liquid crystal display element, without any adhesive therebetween.

4. A device according to claim 1, wherein said phase plate is in contact with said liquid crystal layer, the orientation axis of the film, of the plurality of films, directly in contact with the liquid crystal layer being in agreement with an orientation direction of the liquid crystal layer, the phase plate also constituting an alignment film for the liquid crystal layer.

5. A device according to claim 1, wherein the liquid crystal layer comprises a composition of nematic liquid crystal molecules having an optically positive dielectric anisotropy and contains an optically active substance.

6. A device according to claim 5, wherein the liquid crystal molecules are selected such that the product of the refractive anisotropy $\Delta n$ of the nematic liquid crystal and the thickness d ($\mu$m) of the liquid crystal layer held between the two substrates is 0.4 to 1.5 $\mu$m.

7. A device according to claim 6, which comprises a color filter.

8. A device according to claim 1, wherein said light-permeable electrode is a transparent electrode.

9. A device according to claim 1, wherein each of the films of organic polymer has a thickness of 500 to 1000Å.

10. A liquid crystal display device comprising:
a liquid crystal display element comprising two substrates at least one of which has a liquid-permeable electrode, and a liquid crystal layer sandwiched between the substrates, liquid crystal molecules of the liquid crystal layer having a twist angle of 180 to 270 degrees, and
a phase plate arranged in optical relation with the display element, and comprised of a plurality of films of an organic polymer stacked on each other, each of said films being a film formed by taking up a film of the organic polymer at a rate higher than a spontaneous development rate of the solution of the organic polymer when it is spontaneously developed on a water surface, each of said plurality of films having an orientation axis, adjacent films of said plurality of films having a direction of the orientation axis changed at a constant angle.

11. A device according to claim 10, wherein the phase plate is directly positioned on the liquid crystal display element, without any adhesive therebetween.

12. A device according to claim 10, wherein said phase plate is in contact with said liquid crystal layer, the orientation axis of the film, of the plurality of films, directly in contact with the liquid crystal layer being in agreement with an orientation direction of the liquid crystal layer, the phase plate also constituting an alignment film for the liquid crystal layer.

13. An optical phase plate for a liquid crystal display device, which comprises a plurality of films of an organic polymer stacked on each other, each of the plurality of films having an orientation axis, adjacent films of the plurality of films having a direction of the orientation axis changed at a constant angle.

14. An optical phase plate according to claim 13, wherein each of the films of organic polymer has a thickness of 500 to 1000Å.

15. An optical phase plate according to claim 13, wherein the orientation axis of adjacent films so changed such that a total change of orientation axis of the plurality of films of the optical phase plate is 190°–470°.

16. An optical plate according to claim 15, wherein each of the plurality of films is a film formed by taking up a film of the organic polymer on a water surface at a rate higher than a spontaneous development rate of a solution of the organic polymer, such that molecules of the plurality of films are oriented in the direction of the orientation axis.

17. A liquid crystal display device which comprises:
a liquid crystal display element including a pair of substrates at least one of which has a transparent electrode, a liquid crystal layer sandwiched between the substrates, liquid crystal molecules of the liquid crystal layer having a twist angle of 180 to 270 degrees; and
an optical phase plate arranged in optical relation with the display element, wherein the phase plate is of a stack of layers of an organic polymer, molecules in each of the layers being oriented in a direction and the orientation directions of molecules in adjacent layers being changed such that a total change in orientation direction from a lowermost layer to uppermost layer of said stack of layers is 190 to 470 degrees.

18. The liquid crystal display device according to claim 17, wherein the liquid crystal layer comprises a composition of nematic liquid crystal molecules having an optically positive dielectric anisotropy and contains an optically active substance.

19. The liquid crystal display device according to claim 18, wherein a product of refractive anisotropy $\Delta n$ of the liquid crystal and a thickness d ($\mu$m) of the liquid crystal is 0.4 to 1.5 $\mu$m.

20. A device according to claim 17, which comprises a color filter.

21. A device according to claim 17, wherein the phase plate is directly positioned on the liquid crystal display element, without any adhesive therebetween.

22. A device according to claim 17, wherein said phase plate is in contact with said liquid crystal layer, the orientation axis of the film, of the plurality of films, directly in contact with the liquid crystal layer being in agreement with an orientation direction of the liquid crystal layer, the phase plate also constituting an alignment film for the liquid crystal layer.

23. A liquid crystal display device which comprises:
a liquid crystal display element comprising a pair of substrates at least one of which has a transparent electrode, a liquid crystal layer sandwiched between the substrates, liquid crystal molecules of the liquid crystal layer having a twist angle of 180 to 270 degrees; and
an optical phase plate arranged in optical relation with the display element, wherein the phase plate is a film formed by stacking layers each being formed by spreading on the surface of water a liquid organic polymer, molecules of each of the layers being oriented in a direction and the orientation directions of molecules of adjacent layers being changed such that a total change in orientation direction from a lowermost layer to uppermost layer of said stack of layers is 190 to 470 degrees.

24. The liquid crystal display device according to claim 23, wherein the liquid crystal layer comprises a composition of nematic liquid crystal molecules having an optically positive dielectric anisotropy and contains an optically active substance.

25. The liquid crystal display device according to claim 23, wherein a product of refractive anisotropy $\Delta n$ of the liquid crystal and a thickness d (μm) of the liquid crystal layer is 0.4 to 1.5 μm.

26. A device according to claim 23, which comprises a color filter.

27. A device according to claim 23, wherein the phase plate is directly positioned on the liquid crystal display element, without any adhesive therebetween.

28. A device according to claim 23, wherein said phase plate is in contact with said liquid crystal layer, the orientation axis of the film, of the plurality of films, directly in contact with the liquid crystal layer being in agreement with an orientation direction of the liquid crystal layer, the phase plate also constituting an alignment film for the liquid crystal layer.

* * * * *

UNITED STATES PATENT AND TRADEMARK OFFICE
CERTIFICATE OF CORRECTION

PATENT NO.   :   5,220,447
DATED        :   June 15, 1993
INVENTOR(S)  :   YOKOKURA, et al It is certified that error appears in the above-identified patent and that said Letters Patent is hereby corrected as shown below:

On the title page of the above-identified patent, left-hand column, in the line beginning "[73] Assignees:", insert --Nitto-- before "Denko".

Signed and Sealed this

Fourth Day of April, 1995

Attest:

BRUCE LEHMAN

Attesting Officer    Commissioner of Patents and Trademarks